United States Patent
Asahara et al.

[11] 3,966,448
[45] June 29, 1976

[54] SEALING METHOD FOR LASER GLASS

[75] Inventors: Yoshiyuki Asahara, Kanagawa; Tetsuro Izumitani, Hino; Kenji Nakagawa, Tikorozawa, all of Japan

[73] Assignee: Hoya Glass Works, Ltd., Tokyo, Japan

[22] Filed: Aug. 20, 1974

[21] Appl. No.: 499,098

[30] Foreign Application Priority Data
Aug. 20, 1973 Japan................................. 48-93077

[52] U.S. Cl.................................. 65/43; 65/DIG. 4; 106/47 R
[51] Int. Cl.²...................... C03B 27/00; C03C 3/00
[58] Field of Search.............. 65/43, 40, 36, DIG. 4; 106/47 R

[56] References Cited
UNITED STATES PATENTS

| | | |
|---|---|---|
| 2,248,644 | 7/1941 | Reger et al. ............................. 65/43 |
| 3,254,031 | 5/1966 | DePaolis et al. ................... 106/47 R |
| 3,258,350 | 6/1966 | Martin et al. ..................... 106/47 R |
| 3,420,683 | 11/1969 | Ikeda et al. ......................... 106/47 R |
| 3,778,242 | 12/1973 | Francel.................................... 65/43 |
| 3,881,904 | 5/1975 | Stokes et al. ............................. 65/43 |
| 3,885,974 | 5/1975 | Asahara et al...................... 65/43 X |
| 3,907,535 | 9/1975 | Muller ................................. 65/43 X |
| 3,912,482 | 10/1975 | Lagrouw et al......................... 65/43 |

*Primary Examiner*—S. Leon Bashore
*Assistant Examiner*—Frank W. Miga
*Attorney, Agent, or Firm*—Sughrue, Rothwell, Mion, Zinn & Macpeak

[57] ABSTRACT

A sealing method for a laser glass which provides a high bonding strength comprising applying a powder mixture of (1) a low melting glass for sealing a glass laser and (2) a glass having a higher melting point and lower expansion coefficient than those of the low melting glass, to a laser glass and welding the powder mixture to the laser glass by heating.

6 Claims, 1 Drawing Figure

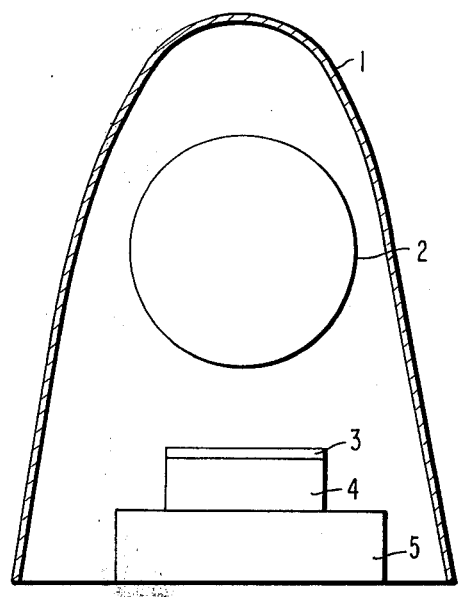

SEALING METHOD FOR LASER GLASS

BACKGROUND OF THE INVENTION

1. Field of the Invention

The present invention relates to a method of welding a sealing glass to a laser glass and more particularly, it relates to a sealing method for a laser glass for increasing the bonding strength between the laser glass and a sealing glass formed thereon.

2. Description of the Prior Art

Recently, it has been reported that the characteristics of a laser can be improved by coating the outside of a laser glass disc with a glass to absorb the light scattered at the inside wall of the laser glass disc. The sealing glass used for this purpose must have properties such that the expansion coefficient of the sealing glass coincides with that of the laser glass as required in a conventional sealing glass and further the sealing glass should be capable of being welded at temperatures lower than the transition point, Tg, of the laser glass in order to not change the characteristics of the laser glass at welding and also the sealing glass should absorb light having definite wavelengths and satisfy sufficiently refractive index requirements. For example, in order to prevent light reflection at the inside wall of a Nd laser glass disc by coating such a sealing glass, the sealing glass must have the ability to absorb light of a wavelength of 1.06 microns, and to prevent light reflection even more effectively, it is desirable that the refractive index of the sealing glass is higher than the refractive index (about 1.6) of an ordinary laser glass but the difference between the refractive indices of the laser glass and the sealing glass be as small as possible. Moreover, in order to not change the characteristics of a laser glass at welding, the sealing glass must have a sealing temperature lower than the Tg (about 450°C to 600°C) of the laser glass, that is, the sealing glass must have a softening point, Sp, lower than the Tg of the laser glass by about 100° C.

To meet these requirements, glasses have previously been discovered which have a low refractive index, the ability to absorb infrared rays, a low melting point, and an expansion coefficient $\alpha$ of $100 \pm 20 \times 10^{-7}/°C$, as described in Japanese patent application No. 25,565/'73 and U.S. patent application Ser. No. 383,743, filed July 30, 1973 now U.S. Pat. No. 3,885,974 issued May 27, 1975. However, since a laser glass is exposed to a xenon flash lamp of 10 kilo joules in a glass laser oscillator, a sealing glass coated on a laser glass is used under quite severe conditions. Therefore, if the sealing glass can weld sufficiently without changing the characteristics of the laser glass, a concern is that the sealing glass may be destroyed due to the low melting point and also since it is desirable that the expansion coefficient $\alpha$ of the sealing glass match the expansion coefficient of the laser glass and also since the sealing glass has an expansion coefficient slightly lower than that of the laser glass so that a compressive stress is always applyed to the sealing layer or film, the bonding strength between the laser glass and the sealing glass is high. Also, a glass having a high melting point and a low expansion coefficient does not absorb infrared rays and thus an infrared absorber may be added to the glass. However, since the addition of the infrared absorber increases the expansion coefficient, it is desirable that the sealing glass used for the aforesaid purpose does not contain such an infrared absorber.

SUMMARY OF THE INVENTION

This invention provides a sealing method for a laser glass which comprises applying a powder mixture of (1) a low melting glass for sealing a glass laser and (2) a glass having a melting point higher than the melting point of the low melting glass and an expansion coefficient lower than the expansion coefficient of the low melting glass to a laser glass and welding the glass mixture to the laser glass by heating.

BRIEF DESCRIPTION OF THE ACCOMPANYING DRAWING

The FIGURE shows a schematic partial cross sectional view showing the exposure test apparatus used in the examples.

DETAILED DESCRIPTION OF THE INVENTION

It has been discovered that by mixing a powder of a low melting glass, e.g., a $B_2O_3$—$Tl_2O$—$ZnO$ glass, a $B_2O_3$—$PbO$—$ZnO$ glass, etc., satisfying the requirements of a sealing glass for a laser glass with a powder of a high melting and low expansion glass and welding the mixture of the glass powders to the laser glass, e.g., at a temperature of about 400° to 600°C, the particles of the low expansion glass are dispersed in the solvent of the fused low melting glass and thus the glass mixture is welded to the laser glass at a low melting point without degrading the essential properties of the sealing glass and also that the expansion coefficient of the sealing glass decreases to a value substantially the same as or lower than the expansion coefficient of $105 \times 10^{-7}/°C$ of the laser glass, whereby the bonding strength between the laser glass and the sealing glass can be increased. A suitable size for the particles of the powder which can be employed ranges up to about 100 $\mu$, preferably not above 10 $\mu$, and a suitable mixing ratio which can be used is about 50 to 98 % by weight of the low melting glass and about 50 to 2 % by weight of the high melting and low expansion glass. A suitable composition for the low melting glass used in this invention is disclosed in U.S. patent application Ser. No. 383,743, filed July 30, 1973 now U.S. Pat. No. 3,885,974 issued May 27, 1975.

The invention is explained more specifically by reference to the following examples. Unless otherwise indicated, all parts and percents are by weight.

EXAMPLE 1

A powder mixture of particles not greater than about 10 $\mu$ in size of a low melting glass (A) comprising 40.4 % by weight $P_2O_5$, 36.7 % by weight PbO, 13.2 % by weight $Ag_2O$, and 9.7 % by weight $V_2O_5$ and having an expansion coefficient, $\alpha$, of $115 \times 10^{-7}/°C$ and a softening point, Sp, of 355°C; and low expansion glass (B) comprising 11.8 % by weight $B_2O_3$, 80.5 % by weight $SiO_2$, 2.0% by weight $Al_2O_3$, 4.4 % by weight $Na_2O$, 0.2 % by weight $K_2O$, 0.1 % by weight MgO, 0.3 % by weight CaO, and 0.7 % by weight $As_2O_3$ and having an expansion coefficient, $\alpha$, of $32 \times 10^{-7}/°C$ and a softening point, Sp, of 820°C in the ratio shown in the table below was coated on a laser glass having an expansion coefficient, $\alpha$, of $105 \times 10^{-7}/°C$ using an organic solvent such as a mixture of amyl acetate and nitrocellulose, or acetone and welded thereto by heating to 460°–480°C.

Then, the laser glass having coated thereon the sealing glass was exposed 1–10 times to a xenon flash lamp of about 6 kilo joules with a distance of 3 cm therefrom using the device as illustrated in the FIGURE of the accompanying drawing, which shows a schematic partial cross sectional view showing the exposure test apparatus used in the examples.

As shown in the FIGURE, laser glass 4 having sealing glass 3 formed thereon is placed on glass support 5 and xenon flash lamp 2 is located above the laser glass. The entire system is placed in aluminum cover 1.

The results obtained are shown in the following table.

| Sample No. | Glass Mixing Ratio (%) A | Glass Mixing Ratio (%) B | 1 Time | Exposure Times 5 Times | 10 Times |
|---|---|---|---|---|---|
| 1 | 100 | 0 | Flaked off | Completely flaked off | — |
| 2 | 95 | 5 | Not flaked off | Partially flaked off | Completely flaked off |
| 3 | 90 | 10 | '' | Not flaked off | Not flaked off |
| 4 | 85 | 15 | '' | '' | '' |
| 5 | 80 | 20 | '' | '' | '' |

EXAMPLE 2

The same procedures as in Example 1 were conducted using a glass comprising 64.4 % by weight $SiO_2$, 4.1 % by weight $Al_2O_3$, 14.2 % by weight $B_2O_3$, 9.6 % by weight ZnO, and 7.5 % by weight $Na_2O$ and having a softening point, Sp, of 585°C and an expansion coefficient, $\alpha$, of $54 \times 10^{-7}$/°C as glass (B). In the test, the sealing glass containing 15 % by weight glass (B) did not flake off by a flash exposure of more than 10 times.

EXAMPLE 3

The same procedures as in Example 1 were conducted using a mixture of 80 % by weight of a glass comprising 37.9 % by weight $P_2O_5$, 35.8 % by weight PbO, 9.7 % by weight $V_2O_5$, 13.2 % by weight $Ag_2O$, and 3.3 % by weight $Na_2O$ and having an expansion coefficient, $\alpha$, of $137 \times 10^{-7}$/°C and a softening point Sp of 345°C as glass (A) and 20 % by weight glass (B) as described in Example 1. The test result showed that the sealing glass could endure a flash exposure of more than 10 times.

While the invention has been described in detail and with reference to specific embodiments thereof, it will be apparent to one skilled in the art that various changes and modifications can be made therein without departing from the spirit and scope thereof.

What is claimed is:

1. A sealing method for a laser glass which comprises applying a powder mixture consisting essentially of (1) a low melting glass for sealing a glass laser and (2) a glass having a melting point higher than the melting point of the low melting glass and an expansion coefficient lower than the expansion coefficient of the low melting glass to an Nd laser glass and welding the glass mixture to the laser glass by heating.

2. The sealing method of claim 1, wherein the proportion by weight of the low melting glass to the high melting glass ranges from about 98:2 to 50:50.

3. The sealing method of claim 1, wherein the welding of the glass mixture to the laser glass is by heating to a temperature of from about 400° to 600°C.

4. The sealing method of claim 1, wherein the particles of the powder mixture have a size of not above 100 microns.

5. The sealing method of claim 1, wherein said low melting glass comprises a $B_2O_3$—$Tl_2O$—ZnO or a $B_2O_3$—PbO—ZnO glass.

6. The sealing method of claim 1 wherein the expansion coefficient of the sealing glass after said welding, is a value substantially the same as or lower than the expansion coefficient of the laser glass.

* * * * *